No. 768,047. Patented August 23, 1904.

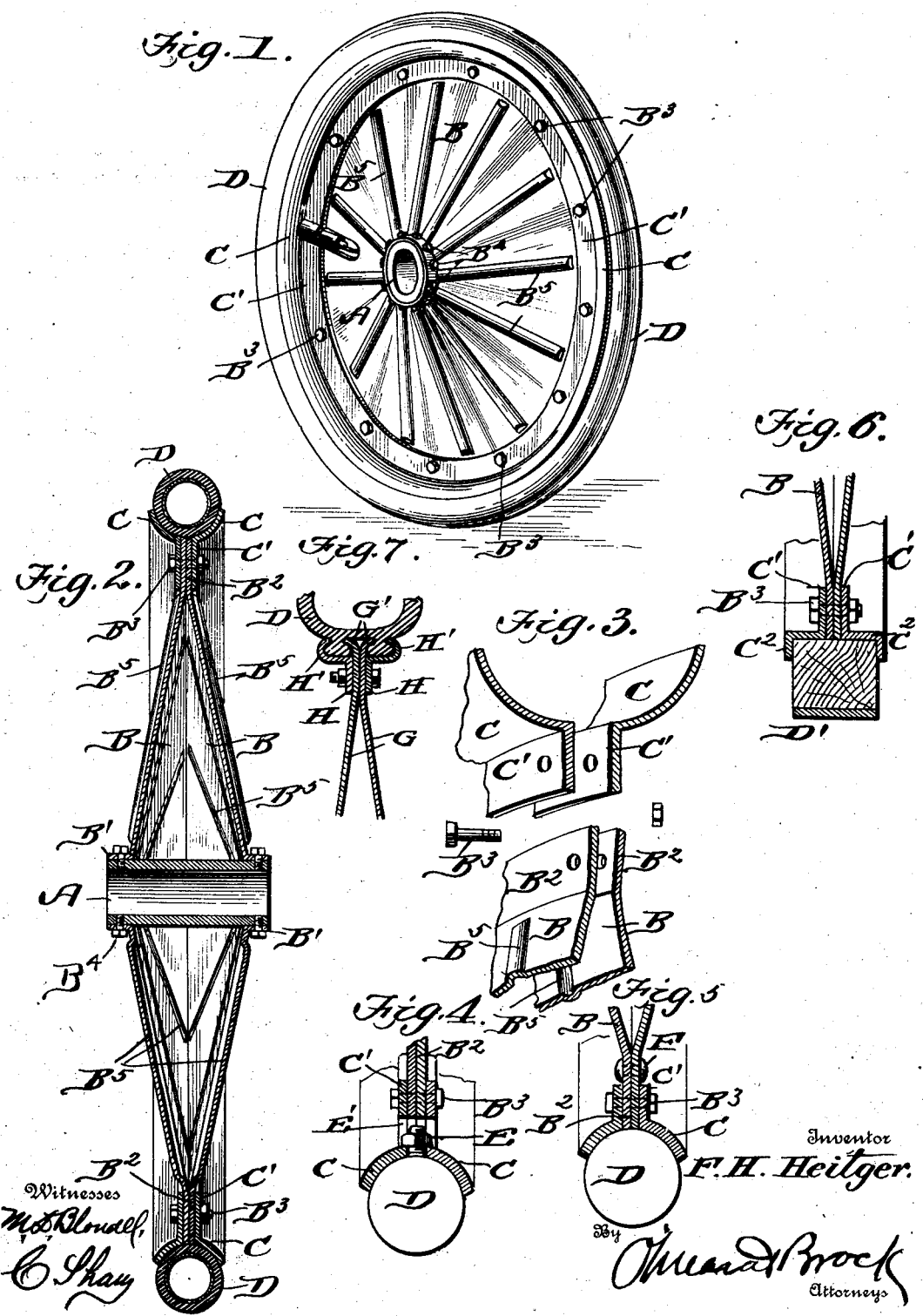

UNITED STATES PATENT OFFICE.

FRANK H. HEITGER, OF BEDFORD, INDIANA.

WHEEL.

SPECIFICATION forming part of Letters Patent No. 768,047, dated August 23, 1904.

Application filed May 16, 1903. Serial No. 157,413. (No model.)

*To all whom it may concern:*

Be it known that I, FRANK H. HEITGER, a citizen of the United States, residing at Bedford, in the county of Lawrence and State of Indiana, have invented a new and useful Wheel, of which the following is a specification.

My invention is an improvement in wheels; and the object is to construct a strong, durable wheel, which shall be adapted for use with the present type of pneumatic tires used on automobiles or with the broad flat tires of farm-wagons and which can be readily taken apart for repair.

In the accompanying drawings, Figure 1 is a perspective view of my wheel complete with a pneumatic tire applied thereto. Fig. 2 is an elevation, partly in section, taken through the hub. Fig. 3 is a detail view showing the manner of connecting the sides of the wheel to the rim, the various parts being shown detached. Fig. 4 is a detail modification showing a mode of bolting the tire to the rim. Fig. 5 is a detail view showing a slight modification, the sides being riveted adjacent the inner edges of the rim. Fig. 6 is a detail showing the rim adapted to receive the flat tire of a farm-wagon. Fig. 7 is a sectional view of a slight modification.

In carrying out my invention I employ the cylindrical hub-section A. The sides of the wheel are formed of two circular metallic plates B, centrally cut out to receive the hub, and around this cut-out portion is an integral outwardly-extending flange B', which is bolted to the hub. The sides are then inclined inwardly, meeting adjacent the rim, and from the point of meeting form straight parallel plates $B^2$ at right angles to the hub. The rim is also composed of two sections, consisting of the curved portion C and the inner straight section C', which fits over the portion $B^2$ of the sides. As shown in Fig. 2, the tire D bears at its sides against the curved portion of the rim, while its under surface bears directly on the periphery of the sides of the wheel. A circular row of bolts $B^3$ pass through the portions C' and $B^2$, and by this construction it is evident that by taking out the bolts just mentioned the rim can be removed in two sections, and by taking out the bolts $B^4$, securing the flange B' to the hub, the wheel can be removed from the hub without any difficulty. To strengthen the wheel, the sides are crimped, forming concavo-convex ribs $B^5$, radiating from adjacent the hub and terminating at the portion $B^2$. The tire may be secured to the rim by cement or may be fastened by bolts and nuts E, in which case openings E' would be formed in the portions C' and $B^2$, into which the head of the bolt would project, the openings being large enough to permit the introduction of a wrench, with which the nuts are turned. In case it should be desired to so secure the sides that the rim be removed by the withdrawal of the bolts $B^3$ without also loosening the two sides of the wheel the latter may be riveted, as shown at F, and in such case the part C' of the rim will be shortened to enable the rivets to be applied to the part $B^2$. It is not essential that the rim have the curved portion C, but it may be angled, as shown at $C^2$ in Fig. 6, in which D' represents the flat tire on a farm or other wagon. It is understood that these forms are not each a distinct type of wheel, but are interchangeable—as, for example, the rim shown in Fig. 6 can be used with the bolt E (shown in Fig. 4) or with the rivets F of Fig. 5.

It is readily seen that this construction gives a wheel of great strength, having no fragile parts, and being of such few and simple parts that it can be quickly assembled and the parts secured in position with no other tool than an ordinary wrench.

In Fig. 7 I have shown a construction employed when it is desired to double-clench the tire. In this construction the side plates G are curved outwardly at the periphery of the wheel, as shown at G'. The rim is formed in two sections, the straight portion H of each section being bolted to the plate G, the portion H' being bent outward at right angles to the portion H and then being curved upwardly and inwardly. The tire D is clenched between the outwardly-curved portions G' of the plates and the parts H' of the rim H.

Having thus fully described my invention, what I claim as new, and desire to secure by Letters Patent, is—

1. A wheel comprising a hub portion, circular sectional side portions having a central opening encircled by an outwardly-extending flange, the said side portions converging toward the periphery of the wheel and having straight parallel portions adjacent said periphery the said plates being curved outwardly at the periphery, and a rim formed in two sections each section having a depending flange portion adapted to contact with the straight portion of one of the side plates, the sides of the rim being curved upwardly and inwardly toward the curved peripheral portions of the plates, substantially as described.

2. A wheel of the kind described comprising side pieces formed of two circular metal plates centrally cut out to receive a hub and having outwardly-extending flanges encircling said opening, the said side plates converging toward the periphery of the wheel and having parallel contacting portions adjacent said periphery, concavo-convex ribs formed radially on the said plates, each rib extending from a point adjacent the flange on the plate to a point adjacent the contact-point of the plates, and a rim having flanges extending downwardly over the contacting portions of the plates, said flanges terminating short of the outer ends of the said ribs.

FRANK H. HEITGER.

Witnesses:
WILLIAM CLARK,
CHAS. C. GAINEY.